United States Patent [19]

Seeney

[11] Patent Number: 4,524,053

[45] Date of Patent: Jun. 18, 1985

[54] PROCESS FOR PREPARING CORES AND MOLDS

[75] Inventor: Charles E. Seeney, Brazil, Ind.

[73] Assignee: International Minerals & Chemical Corp., Terre Haute, Ind.

[21] Appl. No.: 440,918

[22] Filed: Nov. 12, 1982

Related U.S. Application Data

[62] Division of Ser. No. 342,308, Jan. 25, 1982, Pat. No. 4,390,370.

[51] Int. Cl.³ ............................................. C01B 25/36
[52] U.S. Cl. ...................................................... 423/306
[58] Field of Search ................................. 423/306, 305

[56] References Cited

U.S. PATENT DOCUMENTS 4,418,048 11/1983 Dyer et al. ......................... 423/306

FOREIGN PATENT DOCUMENTS 598931  3/1948  United Kingdom ............. 423/305
439473  12/1974  U.S.S.R. ............................ 423/305
891560  12/1981  U.S.S.R. ............................ 423/315

OTHER PUBLICATIONS

Chemical Abstracts 94(3) 14491p.
Chemical Abstracts 94(5) 29444z.
Chemical Abstracts 76(20) 114943j.

Primary Examiner—H. T. Carter
Assistant Examiner—Wayne A. Langel
Attorney, Agent, or Firm—Robert H. Dewey

[57] ABSTRACT

A binder and a hardener therefor for a foundry aggregate. The binder is a resin obtained by reacting phosphoric acid with a mineral silicate. The hardener is a linear alkali metal polyphosphate, ammonium polyphosphate, a source of polyvalent cations, potassium olivine phosphate and other metal silico-phosphates or aluminum dihydrogen phosphate or mixtures there.

3 Claims, No Drawings

PROCESS FOR PREPARING CORES AND MOLDS

This is a division of application Ser. No. 342,308, filed Jan. 25, 1982 now U.S. Pat. No. 4,390,370 issued June 28, 1983.

This invention relates to an improved process for preparing foundry cores and molds using an aggregate and a binder therefor. In a particular aspect this invention relates to an improved inorganic binder for the aggregate and process for preparing it.

Binders for foundry aggregates used for making foundry cores and molds for metal castings are usually organic in nature, i.e. organic polymers and resins. These organic compounds are decomposed or volatilized when the molten metal contacts the core or mold and the resulting fumes and vapors cause a problem of air pollution. There is, therefore, a need to provide an all inorganic, non-volatile binder which is non-contaminating to the environment.

SUMMARY OF THE INVENTION

It is an object of this invention to provide an improved process for preparing foundry molds and cores using a foundry aggregate and a binder therefor.

It is another object of this invention to provide an improved inorganic binder for foundry aggregate and a process for preparing it.

Other objects of this invention will be apparent to those skilled in the art from the disclosure herein.

It is the discovery of this invention to provide an improved process for preparing foundry cores and molds using a foundry aggregate and an inorganic binder therefor. The improvement is provided by using as the binder the reaction product obtained by heating a comminuted mineral silicate including but not limited to zeolites, nepheline syenite and preferably olivine with orthophosphoric acid and using as a hardening agent therefor a metal polyphosphate; ammonium polyphosphate; a polyvalent metal cation; the reaction product obtained by heating olivine with potassium dihydrogen phosphate; aluminum dihydrogen phosphate or mixtures thereof.

DETAILED DISCUSSION

The preferred binder of the present invention is the reaction product obtained by reacting olivine with orthophosphoric acid in a ratio of about 1:3-5 by weight, respectively. A slurry of 20-33% olivine in the customary 85% acid is prepared and is heated with stirring at 70°-100° C. for from 2-6 hours under reflux conditions. The resulting inorganic resin has a viscosity of from 1000-5000 cps and has a shelf life of 2-4 weeks. If the reaction is continued too long, the mixture solidifies and cannot be used. The viscosity should be checked periodically during the reaction and when it rises to 1000 cps or above, the reaction should be terminated. Because of the high viscosity, care must be taken to stir the mixture adequately to avoid localized overheating.

The afore-described resin, which henceforth will be referred to as olivine phosphate, for convenience, is used in an amount of about 1-10% based on the weight of the aggregate, preferably about 4-6%. This resin does not have a sufficiently rapid cure rate to make it useful in no-bake or cold box processes so it is necessary to use a hardener such as polyvalent metal ions. Typical hardeners include but are not limited to magnesium or aluminum oxides; the reaction product of potassium dihydrogen phosphate with olivine (henceforth designated KOP); aluminum dihydrogen phosphate; or linear metal or ammonium polyphosphates. The hardener is used in an amount of about 1:1 by weight of the olivine phosphate. It is understood that considerable departure from this ratio can occur yet remain within the concepts of this invention.

The order of mixing the ingredients in the practice of this invention is not critical. Generally, however, it is preferred to mix the comminuted dry ingredients first, then add the liquids. It is believed that this method best ensures thorough mixing, free from lumps and localized concentrations of one or more ingredients. Thus the aggregate, the olivine phosphate and the hardener (if a solid) may be mixed in one operation. However, the hardener may be a liquid, e.g. a solution, in which case the aggregate and olivine phosphate are mixed first and then the liquid component is added and the mixing continued until the mixture is homogeneous. Generally, ammonium polyphosphate and potassium polyphosphate are added as dry materials, but aluminum dihydrogen phosphate is conveniently added as a solution.

After the aggregate-binder-hardener composition is well mixed, it is delivered to the core or mold box where it is permitted to cure, e.g. for about two hours or until a core hardness of about 50 psi is obtained, e.g. as measured by the Dietert core hardness tester. The core or mold is then removed and is allowed to further harden for several hours or more or overnight.

It is contemplated that the foundry aggregate useful in the practice of this invention can be any known aggregate such as silica sand, zircon, olivine, alumino silicate sand (zeolite), chromite sand and the like. It should be of a particle size consistent with desired result.

Olivine sand is the preferred aggregate for use with the improved binder of this invention. It is a natural mineral consisting of a solid solution rich in magnesium orthosilicate (Fosterite) with a minor amount of ferric orthosilicate (Fayalite). Olivine is a major component of dunite rock. Peridotite is another olivine-bearing rock. Typically, olivine has a composition falling within the following general ranges:

| | |
|---|---|
| MgO | 40-52% by weight |
| $SiO_2$ | 35-45% by weight |
| FeO | 6.5-10% by weight |
| $Al_2O_3$, $K_2O$, $Na_2O$ | Trace |

Any olivine falling within the above ranges is suitable for the practice of this invention.

Ammonium polyphosphate is commercially available in finely divided form, e.g. from Monsanto Chemical Company, and the usual commercial material is suitable for the practice of this invention. Potassium polyphosphate can be readily prepared by heating potassium dihydrogen phosphate at about 500° C. for 1-3 hours. Other useful metal polyphosphates, e.g. zinc polyphosphate, can be similarly prepared.

Although the metal polyphosphates are usually employed as comminuted solids, they can, if preferred, be dispersed in an aqueous medium. Potassium polyphosphate can, for example, be dispersed in an aqueous solution of an ammonium, a lithium, or a sodium salt, e.g. the sulfate, of about 10 wt % concentration, or it can be dispersed in 10 wt % hydrogen peroxide. Ammonium polyphosphate can be dispersed in water or an aqueous solution of sodium, potassium or salt, e.g. the sulfate, or hydrogen peroxide. The mixture with sand is very viscous and must be well-processed to ensure thorough mixing.

The source of polyvalent cations is preferably an alkaline earth material containing both an alkaline earth metal and an oxide. Such material is described, for example, in U.S. Pat. No. 3,923,525 which is incorporated herein by reference thereto.

Included among the suitable hardening materials are calcium oxides, magnesium oxides, calcium silicates, calcium aluminates, calcium aluminum silicates, magnesium silicates, and magnesium aluminates. The preferred hardener is magnesium oxide, or a mixture consisting primarily of magnesium oxide. Also included among the suitable materials of the present invention are the zirconates, borates and titanates of the alkaline earth metals.

It is preferred to employ either a free alkaline earth metal oxide or a mixture of an alkaline earth metal oxide and a material which contains the alkaline earth metal and oxide in combination with another constituent such as calcium aluminates. In addition, the preferred alkaline earth metal oxides are the magnesium oxides.

Those materials which include components in combination with the oxide or hydroxide, and the alkaline earth metal, in some instances can be considered as being a latent source of the alkaline earth metal oxide for introducing the alkaline earth metal oxide into the binder system.

A preferred source of polyvalent ions is provided by a commercially available product, Inoset H, marketed by Ashland Chemical Company, Columbus, Ohio. It is believed to consist largely of magnesium oxide with about 9% aluminum oxide and about 5% calcium oxide.

The orthophosphoric acid used in the practice of this invention is preferably the 85% grade, although less concentrated acid can be used. Phosphoric acid prepared by wet process is preferred to that obtained by oxidation of elemental phosphorous. Wet process acid useful in the practice of this invention is preferably the so-called black acid, but green acid is also a useful acid.

The KOP useful in the practice of this invention is a phospho-silicate simply prepared by heating potassium dihydrogen phosphate with olivine at 800°–900° C. for about one hour. The olivine should be comminuted and preferably pass a 200 mesh sieve. The potassium dihydrogen phosphate can be added as a dry powder, as an aqueous solution, e.g. a saturated solution, or as a slurry. Either the solution or slurry is preferred because it promotes better mixing with the olivine and also is more economical in most instances. The potassium dihydrogen phosphate and olivine are used in a proportion of about 0.4–10:1 by weight respectively, preferably about 1:1. During the heating process, the potassium polyphosphate forms a viscous polymeric melt which solubilizes and then reacts with the olivine. As it cools it forms a brick-hard solid which readily drops from the container when inverted. The material thereby obtained can be allowed to cool to room temperatures and then it can be broken up. However, with time and at ambient temperatures it becomes increasingly more brittle and eventually it crumbles easily. The KOP should be prepared in a heat-resistant and acid resistant vessel, i.e. ceramic. Steel is rapidly attacked by the acidic $KH_2PO_4$ at elevated temperatures.

In a similar manner other silico-phosphates can be prepared by using olivine with melts other than potassium polyphosphate, e.g. zinc polyphosphate, which melts at about 975°–1050° C. Such melts react with most, if not all, silicate species and the resulting products are useful as hardeners in the practice of this invention.

Aluminum dihydrogen phosphate (ADP) useful as a hardener in the practice of this invention is commercially available as a 50% aqueous solution (or dispersion), e.g. from Stauffer Chemical Company. This solution is convenient for use.

The invention will be better understood with reference to the following examples. It is understood that these examples are intended only to illustrate the invention and it is not intended that the invention be limited thereby.

EXAMPLE 1

Olivine 1000 g, comminuted to pass a 200 mesh screen, is slurried with 3000 g of 85% phosphoric acid and heated with stirring at reflux (about 100° C.) for 2 hours. The resulting product (olivine phosphate) is of high viscosity.

Powdered ammonium polyphosphate, 50 g, (fine grained Phos-Chek obtained from Monsanto Chemical Company, St. Louis, Mo. was used) was mixed with 1000 g of olivine sand in a high speed mixer and mixed for 2 minutes. Then 50 g of olivine phosphate was added to the sand mixture with further high speed mixing for 0.5–2 minutes. This material was packed into a core box and permitted to stand for two hours after which time it was stripped from the core box and left to stand overnight. The resulting core has a satisfactory tensile strength.

EXAMPLE 2

The experiment of Example 1 is repeated in all essential details except that Inoset H is substituted for ammonium polyphosphate and is mixed dry with the olivine sand before the oliphos is added. The resulting core has a satisfactory tensile strength.

EXAMPLE 3

The experiment of Example 2 is repeated in all essential details except that comminuted KOP is substituted for Inoset H. The resulting core has a satisfactory tensile strength.

EXAMPLE 4

The experiment of Example 1 is repeated in all essential details except that 100 g of a 50% aqueous solution of aluminum dihydrogen phosphate is substituted for the ammonium polyphosphate. The resulting core has a satisfactory tensile strength.

EXAMPLE 5

The experiment of Example 1 is repeated in all essential details except that silica sand is substituted for olivine sand. The resulting core has a satisfactory tensile strength.

EXAMPLE 6

The experiment of Example 1 is repeated in all essential details except that magnesium oxide is substituted for ammonium polyphosphate. The resulting core has a satisfactory tensile strength.

EXAMPLE 7

The experiment of Example 1 is repeated in all essential details except that a mixture of magnesium oxide with other oxides and metal silicates is substituted for ammonium polyphosphate. The core has a satisfactory tensile strength.

EXAMPLE 8

The experiment of Example 1 is repeated in all essential details except that a mixture of magnesium oxide with metal aluminates is substituted for the ammonium polyphosphate. The resulting core has a satisfactory tensile strength.

EXAMPLE 9

The experiment of Example 1 is repeated in all essential details except that a zeolite is substituted for olivine in the reaction with phosphoric acid. The mold thereby obtained has good compressive strength.

EXAMPLE 10

The experiment of Example 1 is repeated in all essential details except that nepheline syenite is substituted for olivine in the reaction with phosphoric acid. The mold thereby obtained has good compressive strength.

I claim:

1. A composition obtained by reacting phosphoric acid with olivine in a ratio of about 3-5:1 by weight at a temperature of about 70°-100° C. for a period of two hours or more.

2. The composition of claim 1 wherein the phosphoric acid is black or green wet process phosphoric acid.

3. The composition of claim 1 wherein the phosphoric acid is 85% orthophosphoric acid.

* * * * *